(12) United States Patent
Miyasaka et al.

(10) Patent No.: US 8,803,765 B2
(45) Date of Patent: *Aug. 12, 2014

(54) APPARATUS, METHOD AND PROGRAM FOR IMAGE PROCESSING, AND DISPLAY DEVICE

(71) Applicants: Daigo Miyasaka, Tokyo (JP); Masao Imai, Tokyo (JP)

(72) Inventors: Daigo Miyasaka, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/840,337

(22) Filed: Mar. 15, 2013

(65) Prior Publication Data
US 2013/0207883 A1 Aug. 15, 2013

Related U.S. Application Data

(63) Continuation of application No. 12/601,779, filed as application No. PCT/JP2008/059581 on May 23, 2008, now Pat. No. 8,421,812.

(30) Foreign Application Priority Data

May 25, 2007 (JP) ................................. 2007-139605

(51) Int. Cl.
*G09G 5/00* (2006.01)
*G09G 5/02* (2006.01)
*G09G 3/00* (2006.01)
*H04N 5/57* (2006.01)
*H04N 5/66* (2006.01)
*H04N 1/40* (2006.01)
*H04N 1/46* (2006.01)
*G06K 9/00* (2006.01)
*G06K 9/34* (2006.01)
*G06K 9/40* (2006.01)

(52) U.S. Cl.
USPC ............. 345/32; 345/589; 345/690; 345/694; 345/204; 345/77; 348/687; 348/739; 358/448; 358/525; 382/171; 382/254; 382/274; 382/162

(58) Field of Classification Search
USPC .................. 345/589, 690, 426, 77, 204, 694; 348/687, 739; 358/448, 525; 382/162, 382/171, 254, 274
See application file for complete search history.

(56) References Cited

U.S. PATENT DOCUMENTS 4,896,207 A 1/1990 Parulski
6,529,209 B1 3/2003 Dunn et al.
(Continued)

FOREIGN PATENT DOCUMENTS

JP 63-312788 12/1988
JP 3-6974 1/1991
(Continued)

*Primary Examiner* — Wesner Sajous
(74) *Attorney, Agent, or Firm* — Sughrue Mion, PLLC

(57) ABSTRACT

An image processing apparatus sequentially provides a display device with a plurality of image output including a first image, a second image set to become at least a part of an image that is not correlated with the first image when luminance values of pixels of the first image are added to it, and a third image set to become an image, which is obtained by adding luminance values of pixels of all pluralities of images, higher spatial-frequency components than those of the first image. The image processing apparatus has an optical shutter control unit for controlling an optical shutter provided between the display device and a viewer to make the shutter be in a light transmission state while a part of or all the first image is displayed, and in a light interception state while other images are displayed.

6 Claims, 11 Drawing Sheets

(56) References Cited

U.S. PATENT DOCUMENTS

| | | | |
|---|---|---|---|
| 6,674,561 B2* | 1/2004 | Ohnishi et al. | 359/238 |
| 8,421,812 B2* | 4/2013 | Miyasaka et al. | 345/426 |
| 2001/0043163 A1 | 11/2001 | Waldern et al. | |
| 2002/0171807 A1 | 11/2002 | Hibi et al. | |
| 2003/0053003 A1* | 3/2003 | Nishi et al. | 348/744 |
| 2003/0063361 A1* | 4/2003 | Ohnishi et al. | 359/237 |
| 2004/0042707 A1 | 3/2004 | Imai et al. | |
| 2004/0061126 A1 | 4/2004 | Imai et al. | |
| 2007/0126757 A1 | 6/2007 | Itoh et al. | |
| 2009/0045552 A1 | 2/2009 | Imai et al. | |
| 2009/0232127 A1* | 9/2009 | Jaiswal et al. | 370/352 |
| 2009/0244086 A1* | 10/2009 | Miyasaka et al. | 345/589 |
| 2010/0060723 A1 | 3/2010 | Kimura et al. | |
| 2010/0259511 A1 | 10/2010 | Kimura et al. | |

FOREIGN PATENT DOCUMENTS

| | | |
|---|---|---|
| JP | 6-110403 A | 4/1994 |
| JP | 6-118927 | 4/1994 |
| JP | 6-186506 | 7/1994 |
| JP | 7-219489 | 8/1995 |
| JP | 2001-255844 | 9/2001 |
| WO | 2008/026403 | 3/2008 |

* cited by examiner

APPARATUS, METHOD AND PROGRAM FOR IMAGE PROCESSING, AND DISPLAY DEVICE

This application is a continuation of U.S. application Ser. No. 12/601,779 filed Nov. 24, 2009, which is a National Stage of International Application No. PCT/JP2008/59581, filed May 23, 2008, which claims priority from Japanese Patent Application No. 2007-139605, filed on May 25, 2007, the disclosures of which are incorporated herein by reference in their entirety.

TECHNICAL FIELD

The present invention relates to an image processing apparatus, a method and a program therefor, and a display device, and more particularly, to an apparatus capable of presenting a content to a specified user and an authenticated person, and a method and a program therefor.

BACKGROUND ART

Flat panel displays, such as a liquid crystal display and a plasma display, are applied in a wide range from mobile devices, such as a portable telephone, to large equipments, such as a public display. Most of those displays are developed with a focus on a wide viewing angle, high brightness, and high image quality, being required to display an image with clearness and easy to be viewed at any angles.

Meanwhile, some contents shown on displays include confidential information and private data which are not supposed to be viewed in public. Therefore, it is an important issue that a displayed content is protected from general public viewing in a ubiquitous environment that has been developed today along with development of information devices. Even in an office, there is a case where some confidential information, which needs to be protected against view by someone walking behind a seat, is handled.

Some portable telephones include a display with an optical masking shield (a louver) so that a displayed content can be viewed only from a specific direction. Even in such a case, the displayed content can be viewed by someone just behind a person handling it, and security protection is not sufficient.

As a technique to solve the above mentioned problem, there is an "image display device" disclosed in Patent Document 1. The image display device presents an image (hereinafter, referred to as a secret image) to a viewer wearing glasses with an image selecting function, and also presents another image (hereinafter, referred to as a public image) to other viewers.

Specifically, FIG. 11 shows an image display device, in which input image signals 11 are stored in an image data storage memory 12 with a capacity of signals for one frame, controlled by a frame signal 13, then image data in the image data storage memory 12 are read out at twice the speed of frame period, and signals read out primarily are compressed into a half size to become a first image signal 14 and are inputted into a synthetic circuit 15. The secondly read-out image signals have their chroma and luminance converted to become second image signals 17 and inputted into the synthetic circuit 15. Therefore, an image display 18 shows the first image signals 14 and the second image signals 17 alternately. Meanwhile, the frame signal 13 drives a shutter of glasses 21 using a glasses shutter timing generation circuit 19 so that a viewer cannot view an image depending on the second image signals 17. According to such a configuration and operation, those who without glasses view a gray image or a third image (a public image) which is a synthetic image of the first image signals 14 and the second image signals 17, and which has no correlation with the first image signals; on the other hand, those who wear glasses can view a desired image (a secret image) based on the first image signals.

Further, as another technique to solve the aforementioned problem, there is a "Secure method for providing privately viewable data in a publicly viewable display" disclosed in Patent Document 2. The method for providing data capable of being viewed privately, disclosed in Patent Document 2, allows only a permitted user (a viewer) to decipher a private image (a secret image) on a display, at the same time, that allows an unpermitted user to simply view a random pattern, an image difficult to be deciphered, or may be a screen saver image (a public image). In order to promote the object above, an image processing technique including a data hiding pattern and an alternation pattern is synchronized with a display including an image made by an image processing technology, that is, for example, combined with a wearable device such as active glasses. Finally, by a known ability of visual system of human for making a dissimilar image be merged into a single image, a performance can be complete in which data capable of being viewed privately can be presented on a display viewed publicly.

Patent Document 1: Japanese Patent Application Laid-open No. 63-312788
Patent Document 2: Japanese Patent Application Laid-open No. 2001-255844

DISCLOSURE OF THE INVENTION

Problems to be Solved by the Invention

However, inventions disclosed in aforementioned Patent Documents 1 and 2 have a case in which a content of the secret image may be deciphered. When a person without shutter glasses moves his/her gaze direction suddenly, an image by the first image signal and an image by the second image signal are misaligned and an image contour of the secret image in the synthetic image may be perceived. Such a phenomenon occurs even when a person without glasses moves his/her eyes without any intention due to his/her blinking or the like.

Patent Document 2 has another disclosure in which division images, generated by dividing a secret image into a plurality of images, are displayed sequentially having a public image displayed therebetween, so that the secret image, which is a synthetic image of division images, is prevented from being browsed. However, in this case, those who without shutter glasses can easily and instantaneously perceive a division pattern (which is a pattern generated when the secret image is divided into two division images, for example, by way of spatial division) because of their blinking, and the pattern becomes visually annoying.

An object of the present invention is to provide an apparatus, method and program for image processing, and a display device, with which stealing a glance at a secret image and visually annoying display, mentioned above, are restrained with a simple way.

Means for Solving the Problems

In order to achieve the aforementioned object, the image processing apparatus, according to the present invention, for outputting image signals of a plurality of images sequentially to a display device; wherein
a first image and a second image of the plurality of images are in a relationship in which, when luminance values of pixels in the respective images are added, an image having no correlation with the first image is created, and the apparatus comprises:

a unit for setting a third image so that an image obtained by adding luminance values of pixels in all outputted images including the first and the second images becomes an image including a lot of spatial-frequency components which are equal to or higher than spatial-frequency components included in the first image; and an optical shutter control unit for controlling an optical shutter provided between the display device and a viewer to make the shutter be in a light transmission state while a part of or all the first image is displayed, and in a light interception state while other images are displayed.

According to the present invention, a third image (a public image) is set so that an image made by adding a plurality of displayed image including the first image (a secret image) and the second image (a reverse image, for example) at least a part of which is set to have no correlation with the first image becomes an image including a lot of high spatial-frequency components, for example a geometric pattern with high contrast, that is highly visible. Then, the secret image becomes difficult to be viewed. Thus, when a person without using shutter glasses views the image, it is difficult for him/her to perceive the secret image intentionally or unintentionally. In addition, when the public image is set so that spatial-frequency characteristic of an image made by adding all images (including the first, second and third images) becomes similar to a spatial-frequency characteristic of the secret image, a content of the secret image becomes more difficult to be perceived because of masking effect. Thus, the secret image can maintain higher confidentiality against a viewer viewing the image directly without using the optical shutter. As described, a person without wearing shutter glasses is restrained from stealing a glance at a secret image.

Advantageous Effect of the Invention

According to the present invention, a person viewing an image directly without using an optical shutter can be restrained from stealing a glance at the secret image with a simple method.

BEST MODE FOR CARRYING OUT THE INVENTION

Principle of the Invention

Even with the aforementioned conventional arts, those who without wearing shutter glasses can perceive patterns of a secret image or division images without any intention. This perception is created when they intentionally blink at high speed, or when they simply blink during their viewing. The perception is caused by such reasons that a secret image fails to be canceled by time integration between a secret image and a luminance reverse image in which each color component of the secret image is reversed (hereinafter, referred to as a "reverse image"), and conditions of a public image (a luminance value, spatial-frequency characteristic of the image) are in a state with which the secret image becomes easy to be perceived when the cancellation is not performed well.

For example, as shown in FIG. 9(a), when a secret image is a checkered pattern with black-white and a reverse image is a black-white reversed pattern, an uncorrelated image (a perceived image) becomes a solid image having low spatial-frequency where entire tone is the same, and a contour of the checkered pattern can be perceived if a line-of-sight moves instantaneously. Even if a third image (a public image) shown in FIG. 9(b) is added to the above, a person can perceive the checkered pattern (the secret image) unintentionally when the public image is a solid image, by blinking his/her eyes, unless the secret image is much darker than the public image as shown in the figure.

If a public image gathers attention, it becomes hard for a secret image to be caught relatively. Consequently, the perception mentioned above cannot be achieved.

In the present invention, a public image is set to be an image capable of gathering attention easily, for example, a geometric image with high spatial-frequency and high contrast.

Specifically, a public image is constructed, as shown in FIG. 9(c), with high contrast components such as black and white, and is set to be an image having many contour parts in order to gather attention easily, that is, a geometric image with high spatial-frequency. Consequently, a secret image can hardly gather attention relatively and stealing a glance of the secret image can be restrained with the simple method.

Further, when a secret image includes characters as shown in FIG. 9(d), an uncorrelated image (the perceived image) becomes a solid image with low spatial-frequency having the same tone entirely. Therefore, a contour part of the characters can be caught instantaneously when line-of-sight moves, and the characters can be read.

As shown in FIG. 9(e), by setting a geometric pattern in a public image to have a short-term cycle, that is, to have a high spatial-frequency characteristic, a content of the secret image can be less perceived by masking effect, and therefore, the secret image can obtain higher confidentiality. Especially, when a secret image contains characters, the character size and the cycle of the geometric pattern of the public image are made to be equivalent, that is, the spatial-frequencies of the secret image and the public image are made to be same, so that the characters becomes difficult to be read.

In the above description, the case has been explained in which the first, second and third images are displayed independently, in a temporally sequential manner. However, there can be another case as shown in FIG. 9(f), where half luminance of the secret image, i.e., (the first image)/2, and addition of each half luminance of the reverse and public images, i.e., (the second image+third images)/2, may be shown alternately. Moreover, (the first image)/2, (the second image+third image)/2 and (the third image) may be displayed sequentially. In that case, luminance ratio of the first image (a secret image) to the third image (a public image) becomes higher, and at the same time, contrast becomes relatively high. Thus, stealing a glance at the secret image can be prevented more effectively. In the above, all that required is that the secret image and the reverse image are in a relationship in which those are cancelled with each other by adding those luminance values, and the secret image is desirably darker than the public image, as long as it can be viewed.

There is another example with same spatial-frequencies. As shown in FIG. 10(a), it is possible that the third image has characters in the same size of those in the first image. In that case, it is essential that contents of those images are not correlated, and cannot be known by analogy.

FIG. 10(b) shows a case in which a part of the first image is made to be a secret image. The part to be secret is reversed in the second image, and a geometric pattern is provided in the third image. Then, equivalent effect can be obtained.

The above described restraint for perception of the secret image can be also applied to a case of a pattern of division image shown in FIG. 10(c), naturally. In the figure, a checkered pattern of a public image is used as a division pattern, and a secret image is divided into two using the pattern. Reverse images are made by reversing respective division images. Further, a character size is equivalent to a cycle of the geometric pattern of the public image. As shown, a geometric pattern is set to be corresponding to each spatial-frequency characteristic of the division image pattern and the secret image that is a synthetic image of division images. Thus, equivalent effect can be obtained, in which a division image pattern is not eyesore and a content of secret image can be hardly perceived.

The aforementioned is an example with a black-white image; however, the high contrast image can be applicable to a colored image, and it is equivalent to an image with excellent chromaticness.

According to the above description, when the aforementioned method is applied to an apparatus described in the followings, a secret image can be hardly browsed by those who view the displayed image without an optical shutter, that is, for example, those who do not wear the shutter glasses, and the secret image can be displayed with high confidentiality.

First, as an image processing device, the apparatus can achieve a display of a secret image with high confidentiality, by using a public image having a high contrast geometric pattern. Next, as a display device, the apparatus can achieve a display of a secret image with high confidentiality, by displaying a public image having high contrast geometric pattern. Hereinafter, a preferred embodiment based on the above principle will be explained.

First Embodiment

A first embodiment, to which this invention is preferably applied, will be explained. FIG. 1 shows a configuration of an image display apparatus according to the present invention. This image processing apparatus is a specific device for processes based on the principle of the present invention, and includes a memory 101 storing a secret image (a first image), a reverse image (a second image) and a public image (a third image) inputted sequentially; a data allocation circuit 102 for allocating data so that a display device can display the secret image, the reverse image, and the public image outputted sequentially from the memory 101 according to a synchronization signal; and a shutter glasses control signal generation circuit 103 for controlling the shutter glasses to make them be in a light transmission state or a light interception state based on an inputted synchronization signal.

An output signal from the memory 101 is represented by reference numeral 111, one from the data allocation circuit 102 is represented by reference numeral 112, and one from the shutter glasses control signal generation circuit 103 is represented by reference numeral 113.

The secret image, the reverse image, and the public image stored in the memory 101 are sent to the data allocation circuit 102. The data allocation circuit 102 allocates data for outputting the secret, reverse and public images, at every period based on a synchronization signal, and outputs them to the display device.

FIG. 2 shows an example of a timing diagram for one frame period with respect to the output signals 111, 112, 113. Processing in the data allocation circuit 102 will be explained using the timing diagram. In the explanation, one frame is divided into six sub-frames, where the secret image is displayed in two of those sub-frames, the reverse image in other two of those, and the public image in remaining two of those. The number of sub-frames and allocation for each image can be arbitrarily configured, unless an image, obtained by the calculation of luminance synthesis between a secret image display and a reverse image display, has correlation with the secret image.

The secret image, the reverse image, and the public image are inputted to the data allocation circuit 102, and the data allocation circuit 102 allocates data of the secret image into the terms Ton 1 and Ton 2, and allocates data of the reverse image and the public image into the terms Toff 1 and Toff 2. In this case, the secret image S and the reverse image R are set so that an image synthesized by calculation S+R at each pixel is not correlated with the secret image. For example, when the secret image is an image represented by reference numeral 121 shown in the FIG. 2, in which white characters "ABCDEF" are illustrated on a black background, the reverse image becomes an image represented by reference numeral 122 shown in FIG. 2.

In the term Ton 1, the data allocation circuit 102 sends grayscale values of the secret image S to each pixel on the screen of the display device during a data writing period W. After that, the circuit 102 maintains a light transmission state or a light interception state until a next period W.

The data allocation circuit 102 also allocates data of the reverse image R and the public image P in the same sort of processes (a writing process and a light transmission state maintaining process) even in the term Toff 1, and reproduces grayscales of each image.

Also, the data allocation circuit 102 allocates data of the secret image S and the reveres image R in the same sort of processes in the term Ton 2 and Toff 2, and re-creates grayscales of each image.

The signal 113 sent to the shutter glasses makes the glasses be in the light transmission state in the term Ton 1 and Ton 2, and in the light interception state in the term Toff 1 and Toff 2. The signal 113 is generated in the shutter glasses control signal generation circuit 103 based on a synchronization signal of a screen image.

As a result of the above processing, when the public image is a geometric image represented by reference numeral 123 in FIG. 2, for example, a viewer without using the shutter glasses perceives the image represented by reference numeral 124 in FIG. 2.

In the above, the data allocation circuit 102 outputs the secret image S, the reverse image R, and the public image P during one frame period, and an outputting order is basically arbitrary in principle. For example, as shown in FIG. 3, even if the periods for R and P (a fourth sub-frame and a sixth sub-frame) in the timing diagram of FIG. 2 are replaced, a viewer with shutter glasses and a viewer without shutter glasses perceive images with no difference. As in the same manner, order of the secret image, the reverse image, and the public image may be basically arbitrary as long as an output signal is generated in the shutter glasses control signal generation circuit 103 to make the shutter glasses be in the light transmission state during the secret image S display period.

What is important in the above is a pattern of the public image. It is desirable that the public image be a geometric pattern with high contrast so that the secret image becomes difficult to be viewed relatively.

The image shown in FIG. 2 is one example of patterns based on the principle of the present invention, where a high contrast pattern continues in the entire face at a short cycle. When the spatial-frequency characteristic of this pattern and that of a secret image are similar to each other, a content of the secret image becomes difficult to be browsed because of masking effect. For example, a public image pattern is selected, in response to the spatial-frequency of a secret image, from some patterns that are previously stored in the memory. It is more effective that a secret image is divided into a plurality of blocks and a public image pattern having an optimal spatial-frequency is selected for each block.

As mentioned, by selecting a public image, a secret image with high confidentiality can be displayed.

Second Embodiment

A second embodiment, to which the present invention is preferably applied, will be explained. A configuration of an image processing apparatus according to the present embodiment is almost the same as that of the image processing apparatus of the first embodiment; however, the apparatus according to the present embodiment includes a reverse image generation section, and that is a different point from the apparatus of the first embodiment. FIG. 4 shows the configuration of the image processing apparatus according to the present invention. The reverse image generation section 104 inputs a secret image from the memory 101, and outputs a reverse image.

The reverse image generation section 104 generates a value (such as a grayscale value) for a reverse image to cancel a secret image, where the value is corresponding to a luminance value equivalent to a luminance value of "white" display of the secret image made by addition of the secret image and the reverse image. The reason for the above is that an image is perceived on a retina by integrating luminance, not grayscale.

If such a reverse image is generated, the memory does not need to store reverse images, and can be in less size.

According to the aforementioned configuration, an equivalent effect of the first embodiment can be achieved, while an amount of image data to be stored in the memory can reduced.

Third Embodiment

A third embodiment, to which the present invention is preferably applied, will be explained. An image processing apparatus according to the present embodiment has the almost same configuration as that of the first embodiment; however, the apparatus according to the present embodiment includes a public image generation section, and that is a different point from the first embodiment. FIG. 5 shows the configuration of the image processing apparatus according to the present embodiment. The public image generation unit 107 inputs a control signal, which is a synchronization signal and the like, and outputs a public image.

The public image generation section 107 outputs a geometric pattern in response to a control signal such as a synchronization signal. For example, to create a checkered pattern with eight-pixel cycle, an X-Y coordinate of the image is obtained using the synchronization signal, and white is displayed when Xm, a reminder of X divided by 8, and Ym, a reminder of Y divided by 8, are Xm<4 and Ym<4, or Xm>3 and Ym>3, and black is displayed with any other cases. Therefore, the checkered pattern can be obtained according to calculation. Of course, any patterns other than the checkered pattern may be outputted arbitrary, or a public image may be generated by adding a control signal for information indicating a spatial-frequency characteristic based on a secret image pattern.

According to the aforementioned configuration, an equivalent effect of the first embodiment can be achieved, while an amount of image data to be stored in the memory can reduced.

Fourth Embodiment

A fourth embodiment, to which the present invention is preferably applied, will be explained. FIG. 6 shows a configuration of a display device according to the present invention. There is no limitation for the display device, so it may be a plasma display, a display using an MEMS switch, an organic electroluminescence display, a high-speed liquid crystal display, and the like.

This display device is a specific device for processing based on the principle of the present invention, and includes a memory 201 for storing a secret image, a reverse image and a public image inputted sequentially; a display controller 205 for setting display order to be outputted to the display device, according to a synchronization signal, for the secret image, the reverse image and the public image, which are outputted sequentially according to the synchronization signal from the memory 201, and for generating a control signal and an image signal for driving the display device; a shutter glasses control signal generation circuit 203 for controlling shutter glasses to make them be in a light transmission state or a light interception state; and a display section 206.

As shown in the present embodiment, the display controller 205 includes the processing of the data allocation circuit 102 of the first embodiment, and the display device can realize an equivalent effect of the image processing apparatus. The display controller 205 may also include the processing of the reverse image generation section 104 of the second embodiment or the processing of the public image generation section 107 of the third embodiment.

According to the aforementioned configuration, display of a secret image can be achieved with high confidentiality.

Fifth Embodiment

A fifth embodiment, to which the present invention is preferably applied, will be explained. Image processing of the present invention can be conducted as software processing using a computer. That means that an image processing section 131 is practically configured by software in a computer, as shown in FIG. 7.

FIG. 8 shows a flow of an image processing method in the image processing section 131 according to the present embodiment. When a secret image Sin and a reverse image Rin are inputted, in which both are 8-bit raster images, a public image is generated inside the device, and image display order and a glasses state of light transmission or light interception are set, with the image processing method. Steps S2 to S5 are processing in the secret image generation section 107, Steps S6 and S7 are processing in the data allocation circuit 102, and Steps S8 to S10 are processing in the shutter glasses control signal generation circuit 103.

The secret image Sin and the reverse image Rin (8 bit) are inputted into the image processing section 131 (Step S1).

Public Image Generation Processing

The image processing section 131 extracts information indicating that to which pixel the inputted image signal corresponds (that is, an X-Y coordinate of the pixel) (Step S2).

Next, the image processing section 131 determines whether both of a reminder of the X value of the pixel divided by 8 and a reminder of the Y value of the pixel divided by 8 are smaller than 4, or bigger than 3 (Step S3), and when the determined value is true, a value of 255 (which is "white") is selected as a value of the public image P (Step S4), and when the determined value is false, a value of 0 (which is "black") is selected as a value of the public image P (Step S5).

Data Allocation Processing

In this case, one frame will be divided into 6 sub-frames (Step S6), in the same manner as the case in the third embodiment. The image processing section 131 selects and outputs an image in response to the order of a sub-frame to which the image is going to be outputted. Specifically, the image processing section 131 selects Sin for a first sub-frame, Rin for a second one, P for a third one, P for a fourth one, Sin for a fifth one, and Rin for a sixth one. The secret images are outputted so as not to be adjacent to each other (Step S7). The image processing section 131 also makes an image resulted by luminance addition Sin+Rin at every pixel be no correlated with the secret image.

Shutter Control Signal Generation Processing

The image processing section 131 checks whether the selected image is the secret image or not (Step S8), and when it is the secret image, the section outputs a control signal to make the shutter be in the light transmission state (Step S9), and when it is not, the section outputs a control signal to make the shutter be in the light interception state (Step S10).

As above, if software makes a computer execute the processing of the image processing section 131 shown from Steps S1 to S10, an image processing equivalent to that executed by the image processing apparatus according to the third embodiment can be executed without a specific hardware.

The flowchart shown in FIG. 8 is about an image processing equivalent to that executed by the image processing apparatus according to the third embodiment of the present invention. In addition, software can also make a computer execute an image processing equivalent to that executed in the first and the second embodiments of the present invention. When the software processing is built up as a program, the program is recorded on a recording medium and becomes a target for business transaction.

Each of the above embodiments is an example of preferred embodiments, and the present invention is not limited to those.

For example, the above embodiments do not have specific description about respective RGB signals; however, if the embodiments are conducted with respect to each of the signal components, the effect of the present invention can be also achieved for a colored image.

In addition, a raster image does not need to be a colored image including a plurality of image signals, it may be a monochromatic image. That is, it is not necessary that the configurations shown in the above embodiments are provided for each color in parallel.

Further, the shutter glasses are used for perceiving a secret image in the above; however, the configuration is not limited to using the glasses. Any configuration can be applicable as long as a shutter is provided between a display and eyes.

Moreover, the present embodiments uses a secret image for explaining the present invention; however, an equivalent effect can be achieved with the present invention even for a content and a pattern of division images of a secret image with the same configuration.

As described, the present invention is capable of having various changes.

Aforementioned, the present invention has been explained with reference to the embodiments (and examples), however, the present invention is not limited to the above embodiments (and examples). Configurations and details of the present invention can be modified within the scope of the invention, as long as those skilled in the art can understand the modification.

This application claims priority based on the Japanese Patent Application No. 2007-139605, filed on May 25, 2007, and the entire disclosures of which are hereby incorporated.

REFERENCE NUMERALS

Figure 1:
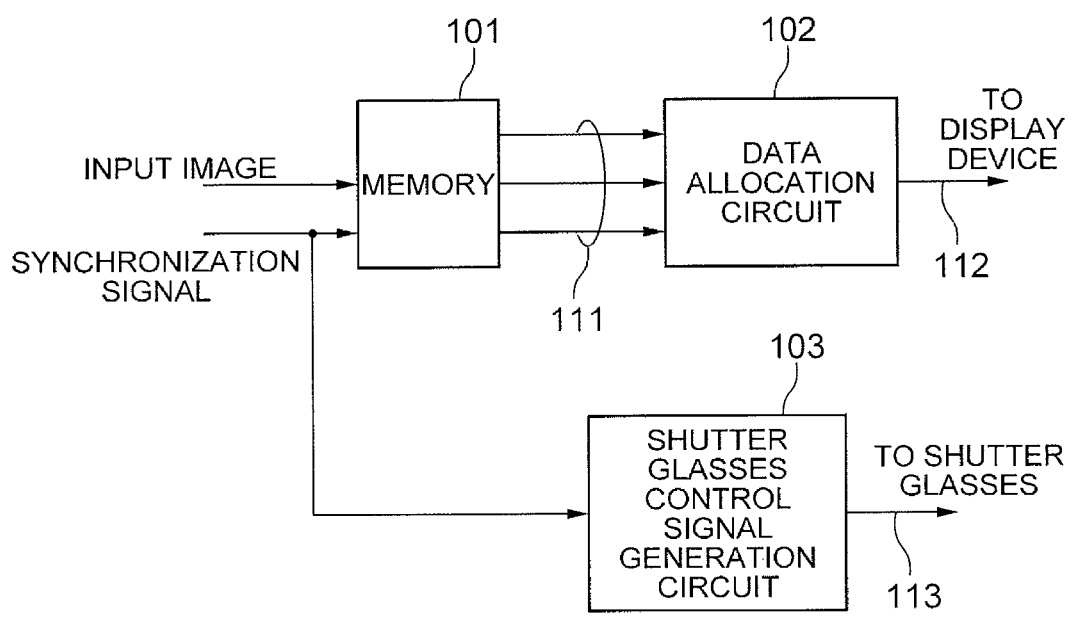
FIG. 1 is a diagram showing a configuration of an image processing apparatus according to a first embodiment to which the present invention is preferably applied.
Figure 2:
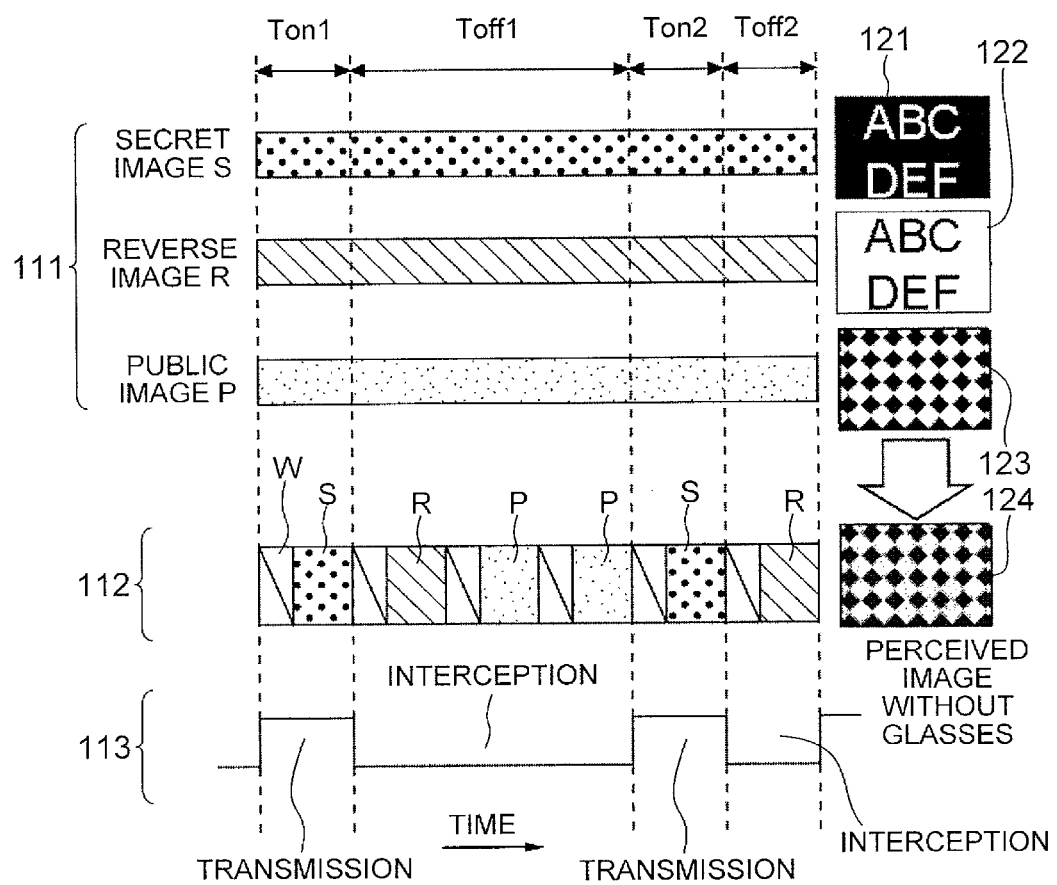
FIG. 2 is a diagram showing an example of a timing diagram for each control signal in the image processing apparatus according to the first embodiment.
Figure 3:
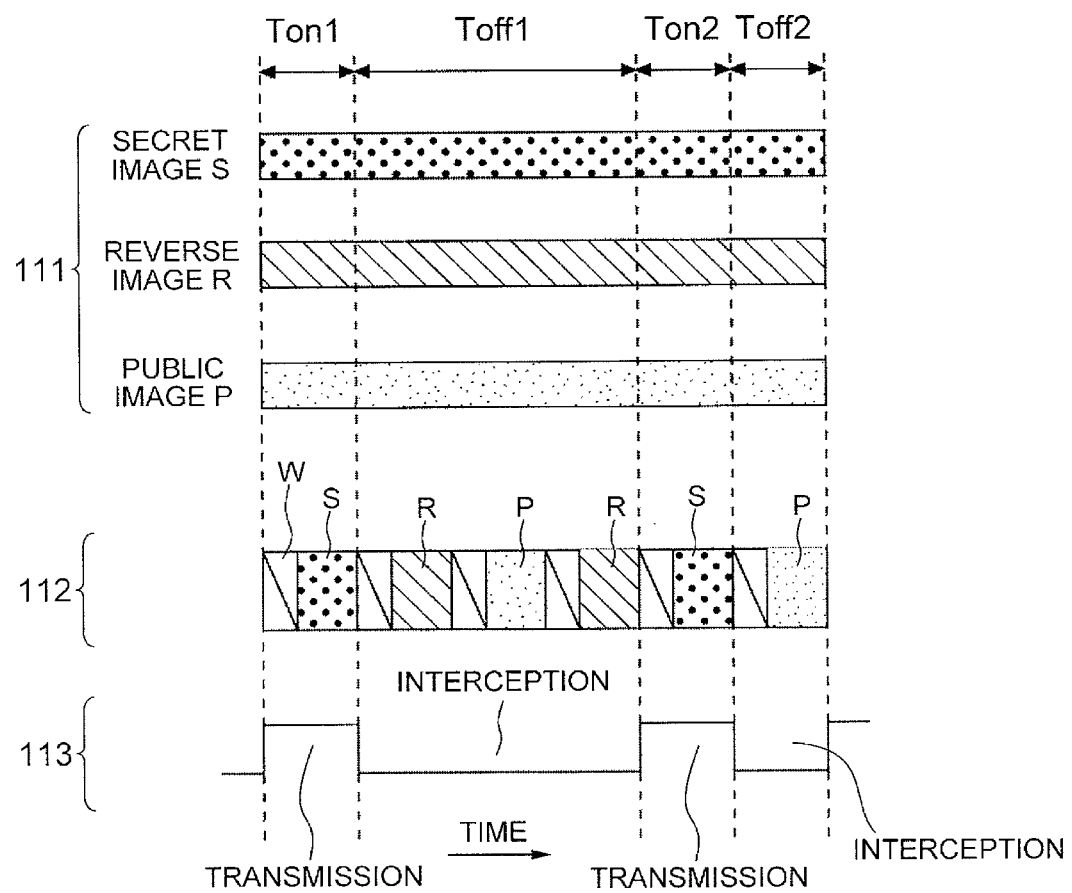
FIG. 3 is a diagram showing another example of a timing diagram for each control signal in the image processing apparatus according to the first embodiment.
Figure 4:
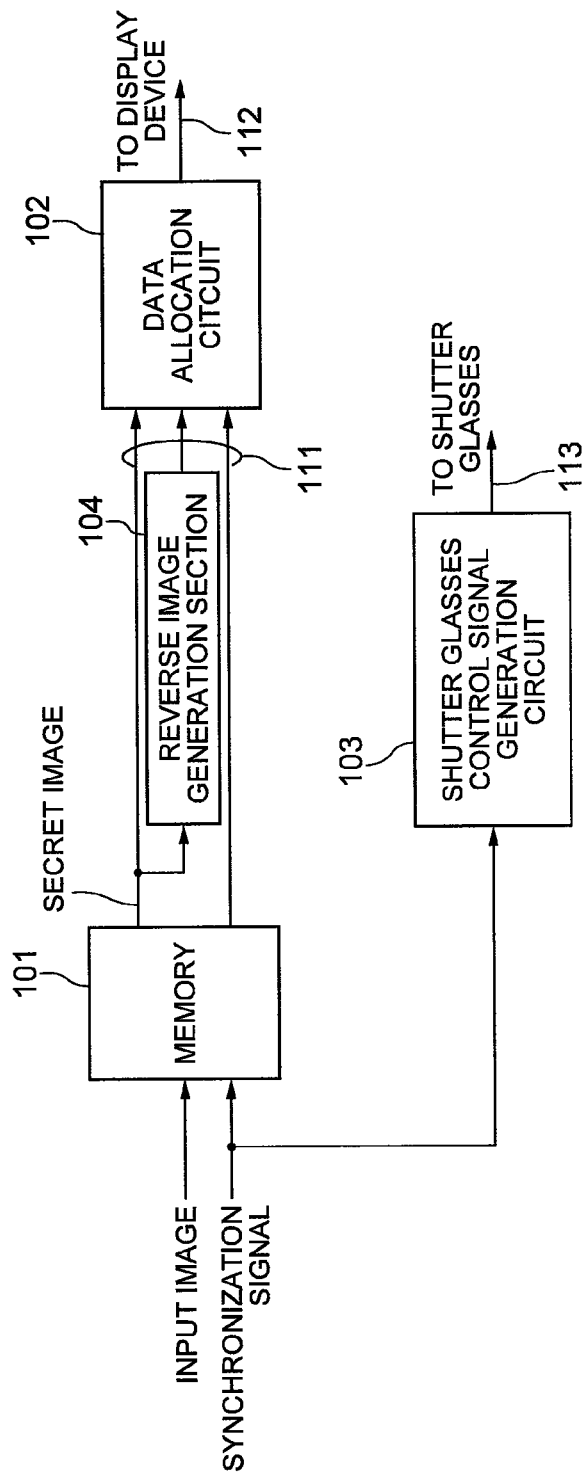
FIG. 4 is a diagram showing a configuration of an image processing apparatus according to a second embodiment to which the present invention is preferably applied.
Figure 5:
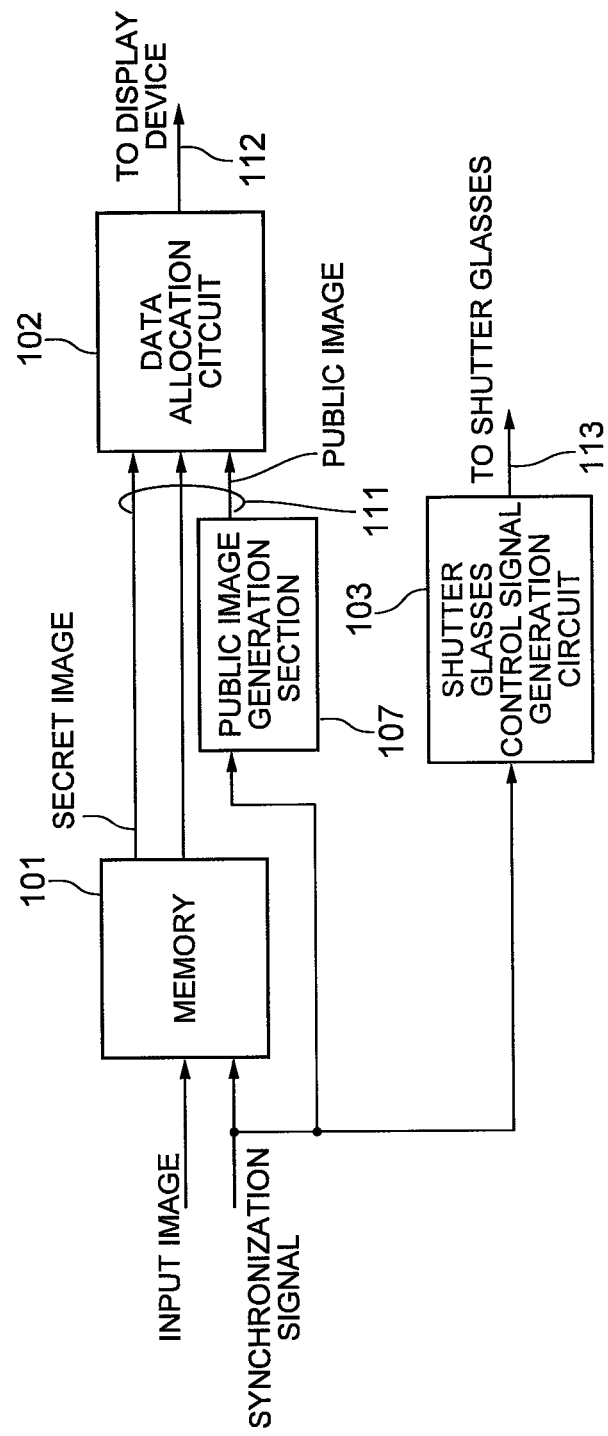
FIG. 5 is a diagram showing a configuration of an image processing apparatus according to a third embodiment to which the present invention is preferably applied.
Figure 6:
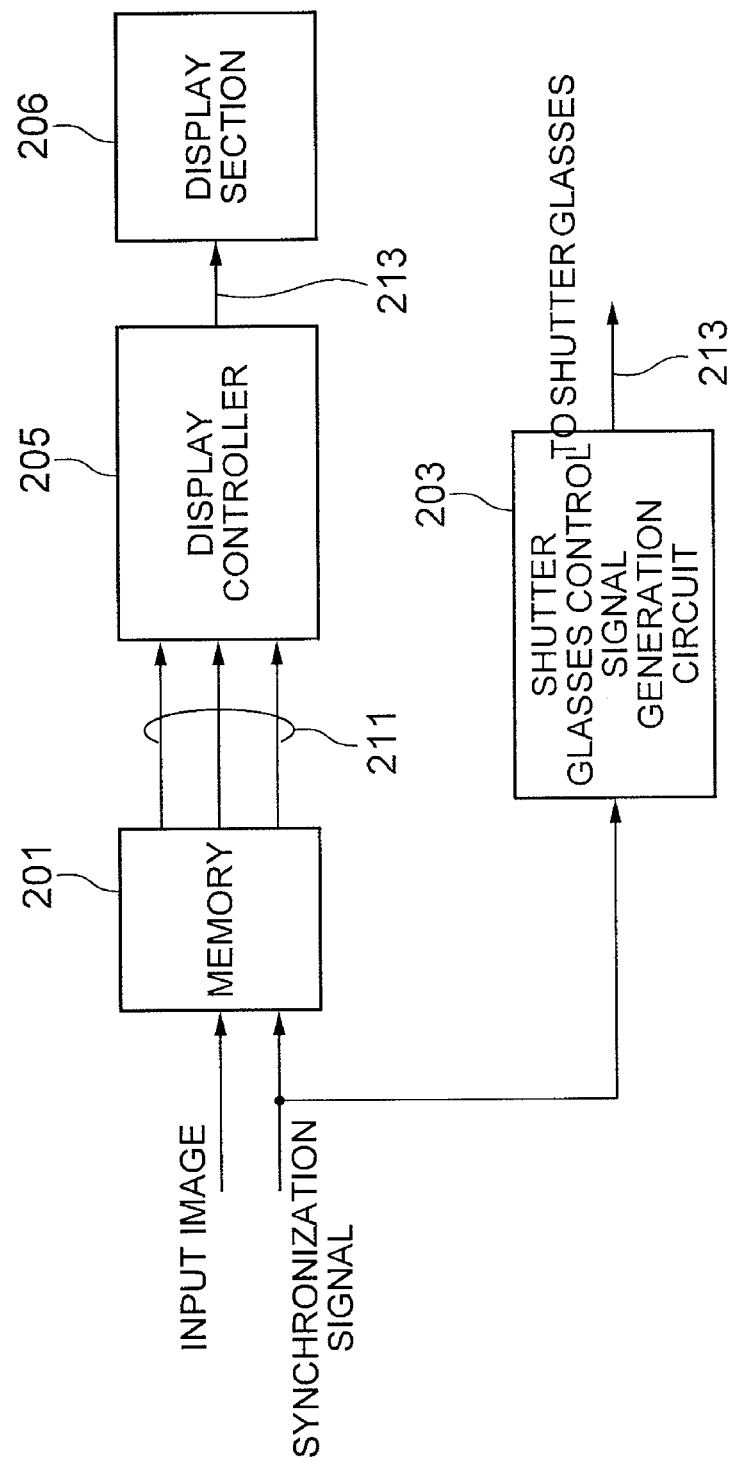
FIG. 6 is a diagram showing a configuration of a display device according to a fourth embodiment to which the present invention is preferably applied.
Figure 7:
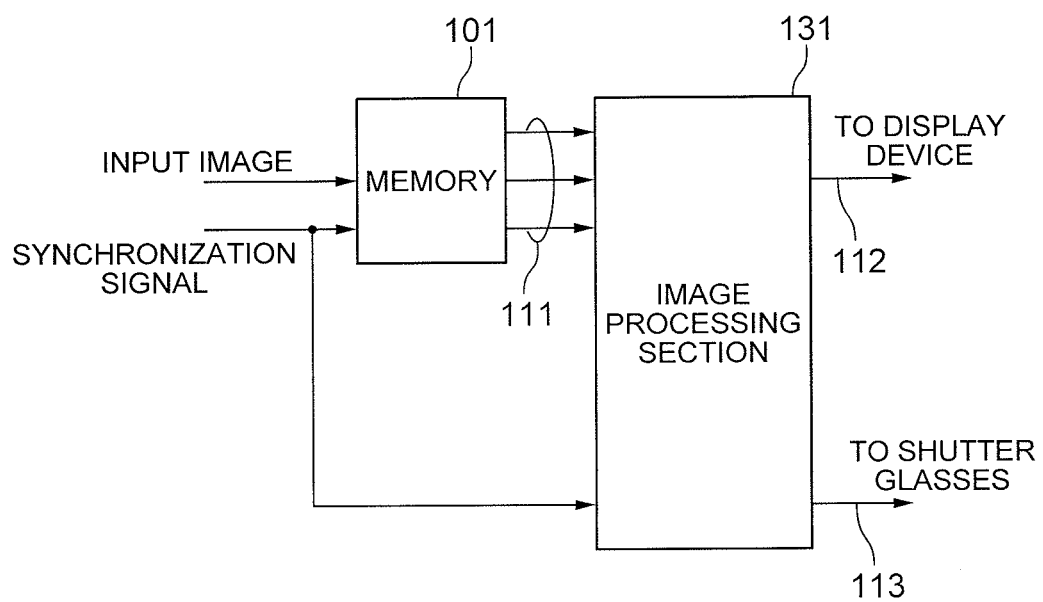
FIG. 7 is a diagram showing a configuration of an apparatus for performing an image processing method according to a fifth embodiment to which the present invention is preferably applied.
Figure 8:
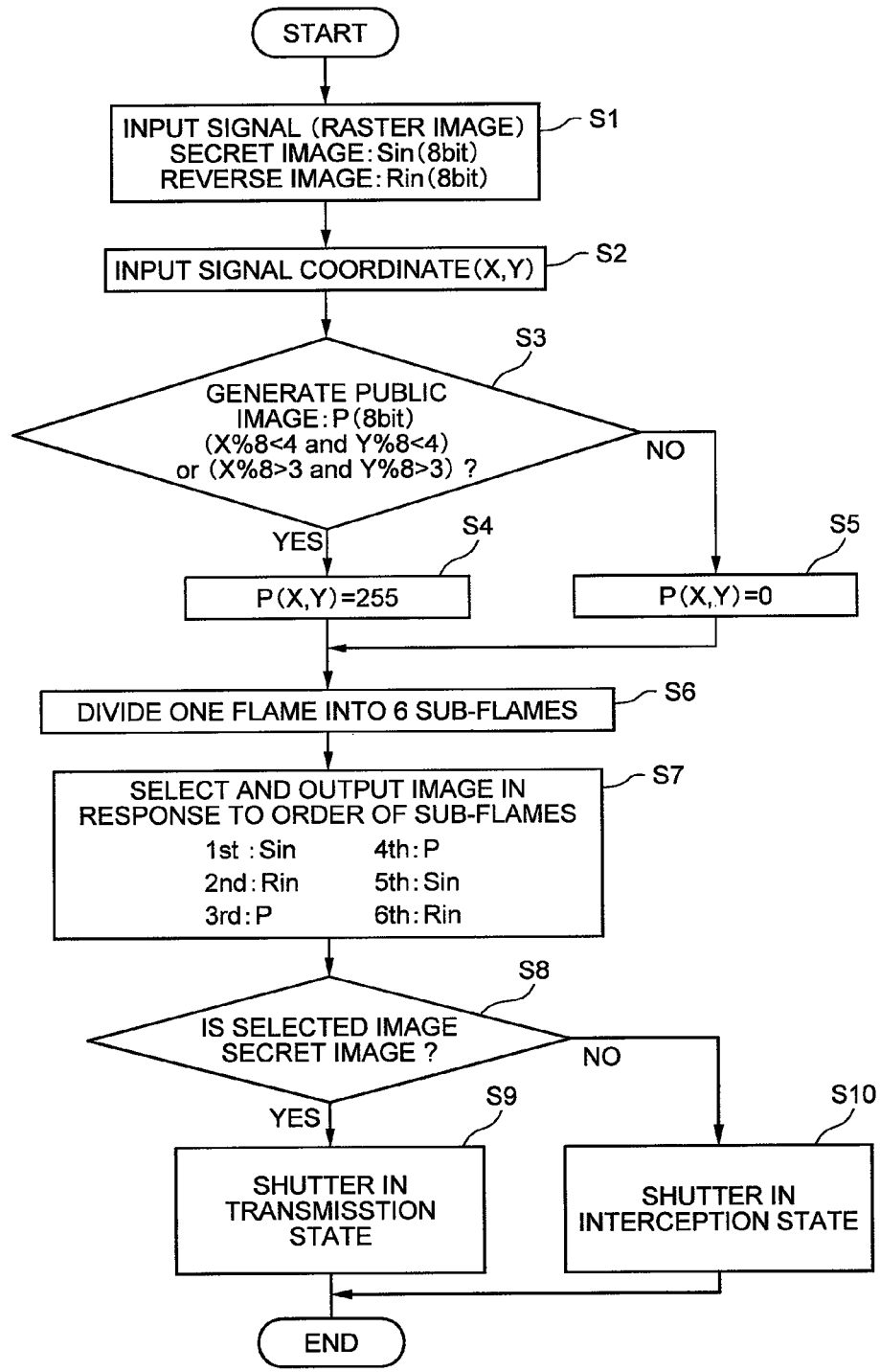
FIG. 8 is a flowchart showing a flow of processing in the image processing method according to the fifth embodiment.
Figure 9A:
FIGS. 9(a) to 9(f) are diagrams explaining a principle of the present invention.
Figure 9B:
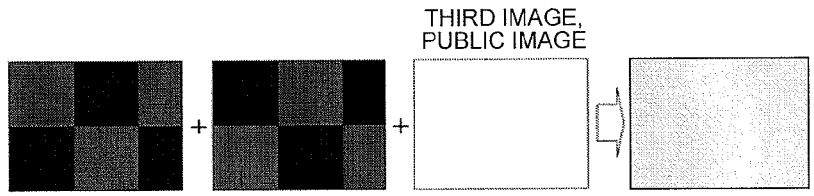
Figure 9C:
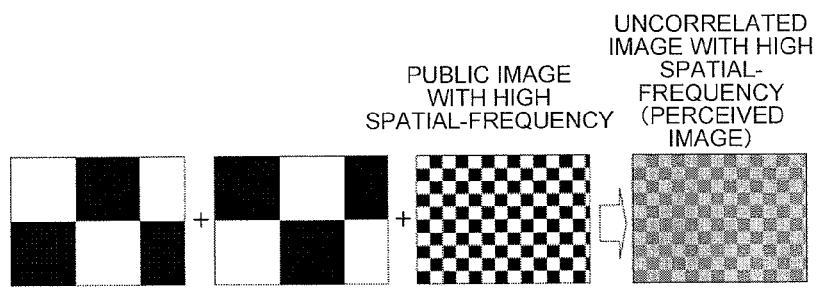
Figure 9D:
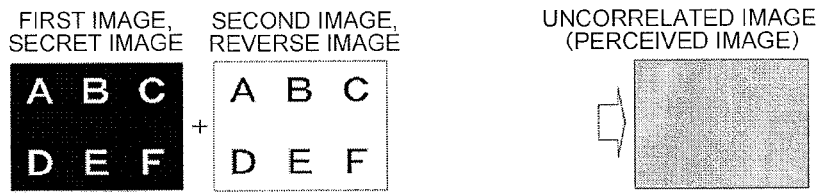
Figure 9E:
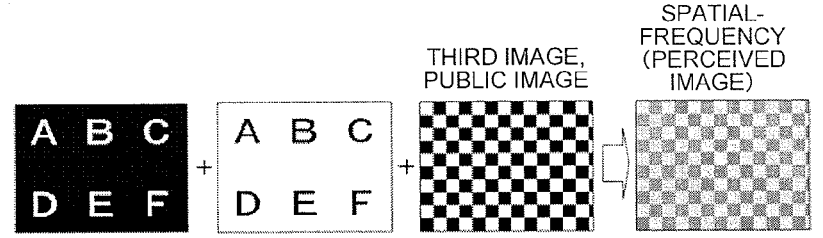
Figure 9F:
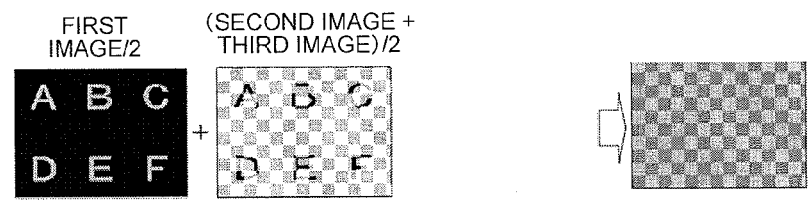
Figure 10A:
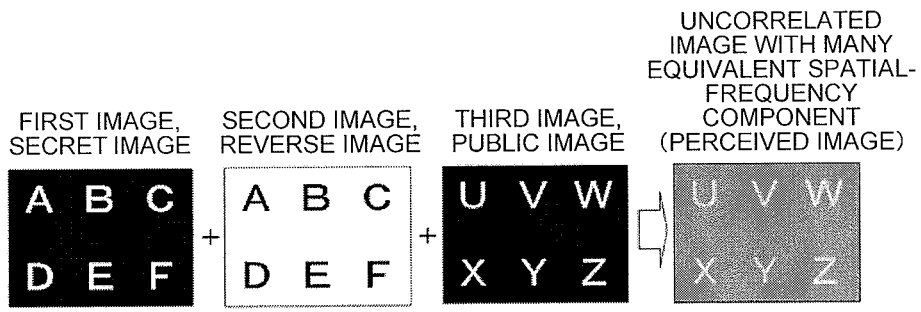
FIGS. 10(a) to 10(c) are diagrams explaining a principle of the present invention.
Figure 10B:
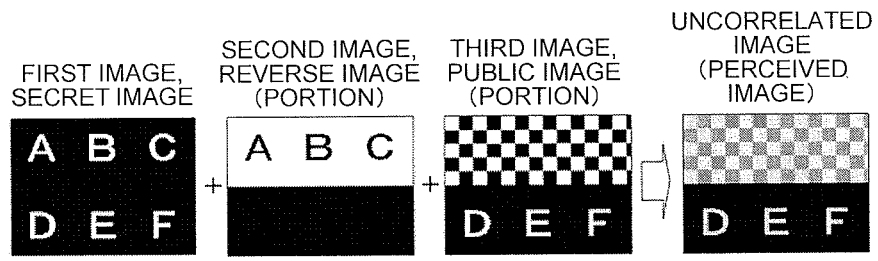
Figure 10C:
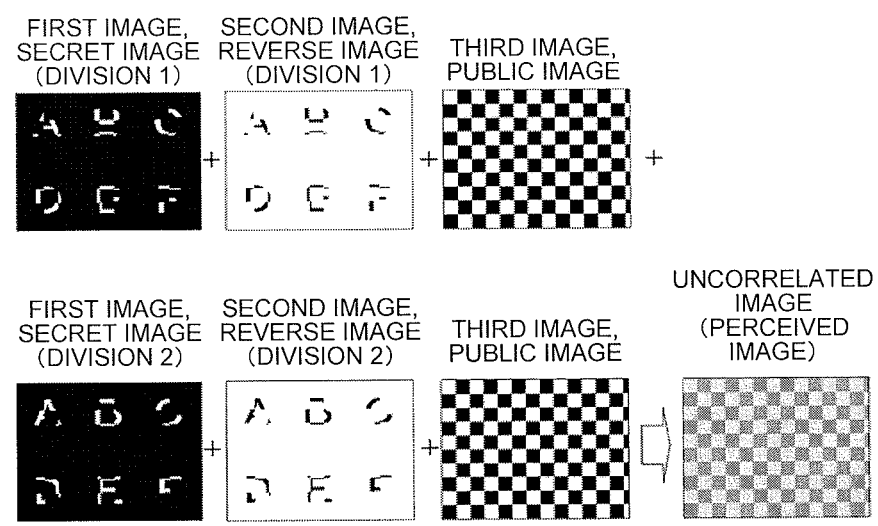
Figure 11:
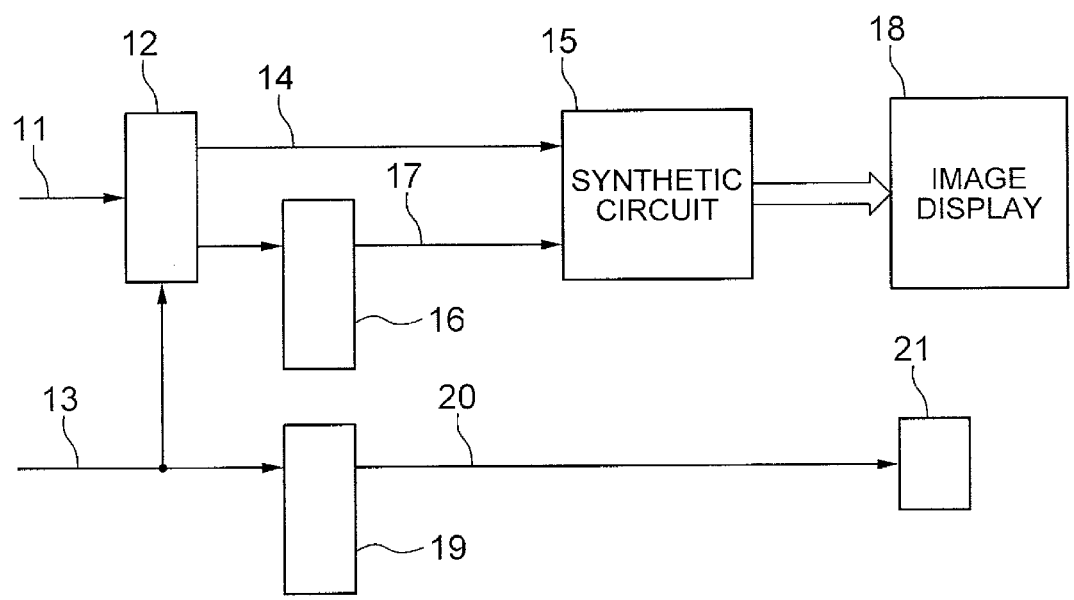
FIG. 11 is a diagram showing a configuration of an image processing device according to an art in a multipurpose type.

101 Memory
102 Data allocation circuit
103 Shutter glasses control signal generation circuit
104 Reverse image generation section
105 Display controller
106 Display section
107 Public image generation section
111 Output signal from memory 101
112 Output signal from data allocation circuit 102
113 Output signal from shutter glasses control signal generation circuit 103
131 Image processing section
201 Memory
202 Display controller
203 Shutter glasses control signal generation circuit
206 Display section

The invention claimed is:

1. An image processing apparatus for outputting image signals of a plurality of images sequentially to a display device, wherein
the plurality of images includes a first image, a second image and a third image, and the first and the second images are in a relationship in which, when luminance values of pixels in the respective first and second images are added, an image having no correlation with the first image is created; and wherein:
the first image includes division images generated by diving the first image into a plurality of images, and the third image is a public image viewed by unspecified viewers, the image processing apparatus comprising:

a unit for setting the third image so that the image obtained by adding luminance values of pixels of all output images including the first and the second images becomes an image including a lot of spatial-frequency components which are equal to or higher than spatial-frequency components included in a division pattern used in generating the division images; and an optical shutter control unit for controlling an optical shutter provided between the display device and a viewer to make the optical shutter be in a light transmission state while a part of or all the first image is displayed, and in a light interception state while other images are displayed.

2. An image processing method for outputting image signals of a plurality of images sequentially to a display device, wherein the plurality of images includes a first image, a second image and a third image, and the first and the second images in the plurality of images are in a relationship in which, when luminance values of pixels in the respective first and second images are added, an image having no correlation with the first image is created, and wherein:

the first image includes division images generated by dividing the first image into a plurality of images, and the third image is a public image viewed by unspecified viewers, the method comprising:

setting the third image so that the image obtained by adding luminance values of pixels of all output images including the first and the second images becomes an image including a lot of spatial-frequency components which are equal to or higher than spatial-frequency components included in a division pattern used in generating the division images; and controlling an optical shutter provided between the display device and a viewer to make the optical shutter be in a light transmission state while a part of or all the first image is displayed, and in a light interception state while other images are displayed.

3. A computer readable recording medium storing an image processing program for controlling image signals of a plurality of images and for outputting the image signals sequentially to a display device, wherein the plurality of images includes a first image, a second image and a third image, and the first and the second images are in a relationship in which, when luminance values of pixels in the respective first and second images are added, an image having no correlation with the first image is created, wherein:

the first image includes division images generated by dividing the first image into a plurality of images, and the third image is a public image viewed by unspecified viewers, and the image processing program makes a computer execute the functions of:

setting the third image so that the image obtained by adding luminance values of pixels in all output images including the first and the second images becomes an image including a lot of spatial-frequency components which are equal to or higher than spatial-frequency components included in a division pattern used in generating the division images; and controlling an optical shutter provided between the display device and a viewer to make the optical shutter be in a light transmission state while a part of or all the first image is displayed, and in a light interception state while other images are displayed.

4. A display device for displaying sequentially image signals of a plurality of images, wherein the plurality of images includes a first image, a second image and a third image, and the first and the second images are in a relationship in which, when luminance values of pixels in the respective first and second images are added, an image having no correlation with the first image is created, wherein:

the first image includes division images generated by dividing the first image into a plurality of images, and the third image is a public image viewed by unspecified viewers, and the device comprising:

a unit for setting the third image so that the image obtained by adding luminance values of pixels in all output images including the first and the second images becomes an image including a lot of spatial-frequency components which are equal to or higher than spatial-frequency components included in a division pattern used in generating the division images; and an optical shutter control unit for controlling an optical shutter provided between the display device and a viewer to make the optical shutter be in a light transmission state while a part of or all the first image is displayed, and in a light interception state while other images are displayed.

5. An image processor for outputting image signals of a plurality of images sequentially to a display device, wherein the plurality of images includes a first image, a second image and a third image, and the first and the second images are in a relationship in which, when luminance values of pixels in the respective first and second images are added, an image having no correlation with the first image is created, wherein:

the first image includes division images generated by dividing the first image into a plurality of images, and the third image is a public image viewed by unspecified viewers, and the image processor comprising:

a unit for setting the third image so that the image obtained by adding luminance values of pixels of all output images including the first and the second images becomes an image including a lot of spatial-frequency components which are equal to or higher than spatial-frequency components included in a division pattern used in generating the division images; and an optical shutter controller for controlling an optical shutter provided between the display device and a viewer to make the optical shutter be in a light transmission state while a part of or all the first image is displayed, and in a light interception state while other images are displayed.

6. A display for displaying sequentially image signals of a plurality of images, wherein the plurality of images includes a first image, a second image and a third image, and the first and the second images are in a relationship in which, when luminance values of pixels in the respective first and second images are added, an image having no correlation with the first image is created, wherein:

the first image includes division images generated by dividing the first image into a plurality of images, and the third image is a public image viewed by unspecified viewers, and the display comprising:

a unit for setting the third image so that the image obtained by adding luminance values of pixels in all output images including the first and the second images becomes an image including a lot of spatial-frequency components which are equal to or higher than spatial-frequency components included in a division pattern used in generating the division images;

an optical shutter controller for controlling an optical shutter provided between the display and a viewer to make the optical shutter be in a light transmission state while a part of or all the first image is displayed, and in a light interception state while other images are displayed.

* * * * *